United States Patent
Kareff et al.

(10) Patent No.: US 10,472,975 B2
(45) Date of Patent: Nov. 12, 2019

(54) DAMPER PIN HAVING ELONGATED BODIES FOR DAMPING ADJACENT TURBINE BLADES

(71) Applicant: General Electric Company, Schenectady, NY (US)

(72) Inventors: Spencer A. Kareff, Simpsonville, SC (US); Poorna Krishnakumar, Greenville, SC (US); Kevin Lee Worley, Easley, SC (US); Christopher Michael Penny, Greer, SC (US); Stephen Paul Wassynger, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1104 days.

(21) Appl. No.: 14/844,280

(22) Filed: Sep. 3, 2015

(65) Prior Publication Data

US 2017/0067346 A1 Mar. 9, 2017

(51) Int. Cl.
*F01D 5/22* (2006.01)

(52) U.S. Cl.
CPC ............ *F01D 5/22* (2013.01); *F05D 2220/32* (2013.01)

(58) Field of Classification Search
CPC .. F01D 5/22; F05D 2220/32; F05D 2250/312; F05D 2250/41; Y02T 50/671
USPC ........................................ 416/190, 135, 248
See application file for complete search history.

(56) References Cited

U.S. PATENT DOCUMENTS

| | | | |
|---|---|---|---|
| 3,266,770 | A | 8/1966 | Harlow |
| 3,881,844 | A | 5/1975 | Hennessey et al. |
| 4,872,812 | A | 10/1989 | Hendley et al. |
| 4,936,749 | A | 6/1990 | Arrao et al. |
| 5,226,784 | A | 7/1993 | Mueller et al. |
| 5,478,207 | A | 12/1995 | Stec |
| 5,827,047 | A | 10/1998 | Gonsor et al. |
| 6,171,058 | B1 | 1/2001 | Stec |
| 6,354,803 | B1 | 3/2002 | Grover et al. |

(Continued)

FOREIGN PATENT DOCUMENTS

| | | |
|---|---|---|
| EP | 2 472 065 A1 | 7/2012 |
| EP | 2 738 353 A2 | 6/2014 |

(Continued)

OTHER PUBLICATIONS

Extended European Search Report and Opinion issued in connection with related EP Application No. 16185251.2 dated Jan. 31, 2017.

(Continued)

*Primary Examiner* — Mark A Laurenzi
*Assistant Examiner* — Paul W Thiede
(74) *Attorney, Agent, or Firm* — Dority & Manning, P.A.

(57) ABSTRACT

A damper pin for damping adjacent turbine blades coupled to a rotor disk comprises a first elongated body having a center portion disposed between a first end portion and a second end portion. The first end portion, center portion and second end portion define a generally arcuate top portion of the first elongated body. The first elongated body defines a slot that extends axially therethrough. The damper pin further includes a second elongated body having a generally arcuate top portion. The second elongated body is at least partially disposed within the slot and is slideably engaged in an axial direction with the first elongated body.

13 Claims, 3 Drawing Sheets

(56) References Cited

U.S. PATENT DOCUMENTS

| | | | |
|---|---|---|---|
| 6,450,769 | B2 | 9/2002 | Szwedowicz |
| 6,478,544 | B2 | 11/2002 | Brandl et al. |
| 6,659,725 | B2 | 12/2003 | Yeo et al. |
| 6,776,583 | B1 | 8/2004 | Wang et al. |
| 6,851,932 | B2 | 2/2005 | Lagrange et al. |
| 7,163,376 | B2 | 1/2007 | Itzel et al. |
| 7,534,090 | B2 | 5/2009 | Good et al. |
| 7,731,482 | B2 | 6/2010 | Lagrange et al. |
| 2006/0257262 | A1* | 11/2006 | Itzel .......... F01D 5/22 416/248 |
| 2013/0276456 | A1 | 10/2013 | Propheter-Hinckley et al. |
| 2014/0079529 | A1 | 3/2014 | Kareff et al. |
| 2014/0112792 | A1 | 4/2014 | Thomen et al. |
| 2014/0147276 | A1* | 5/2014 | Roberts, III ......... F01D 5/3084 416/135 |

FOREIGN PATENT DOCUMENTS

| | | |
|---|---|---|
| EP | 3 043 085 A1 | 7/2016 |
| EP | 3 070 274 A1 | 9/2016 |
| EP | 3 078 808 A1 | 10/2016 |
| EP | 3 093 439 A1 | 11/2016 |

OTHER PUBLICATIONS

Extended European Search Report and Opinion issued in connection with related EP Application No. 16183857.8 dated Feb. 3, 2017.

Extended European Search Report and Opinion issued in connection with corresponding EP Application No. 16186535.7 dated Feb. 3, 2017.

Extended European Search Report and Opinion issued in connection with related EP Application No. 16183856.0 dated Feb. 3, 2017.

Extended European Search Report and Opinion issued in connection with related EP Application No. 16184881.7 dated Feb. 3, 2017.

Extended European Search Report and Opinion issued in connection with related EP Application No. 16185255.3 dated Feb. 3, 2017.

Non-Final Rejection towards related U.S. Appl. No. 14/844,294 dated Mar. 23, 2017.

Final Rejection towards related U.S. Appl. No. 14/844,294 dated Jul. 24, 2017.

Co-Pending U.S. Appl. No. 14/844,294, filed Sep. 3, 2015
Co-Pending U.S. Appl. No. 14/844,306, filed Sep. 3, 2015.
Co-Pending U.S. Appl. No. 14/844,317, filed Sep. 3, 2015.
Co-Pending U.S. Appl. No. 14/844,392, filed Sep. 3, 2015.
Co-Pending U.S. Appl. No. 14/988,070, filed Jan. 5, 2016.
Co-Pending U.S. Appl. No. 14/844,545, filed Sep. 3, 2015.
U.S. Appl. No. 14/844,294, filed Sep. 3, 2015, Kareff, et al.
U.S. Appl. No. 14/844,306, filed Sep. 3, 2015, Kareff, et al.
U.S. Appl. No. 14/844,317, filed Sep. 3, 2015, Kareff, et al.
U.S. Appl. No. 14/844,392, filed Sep. 3, 2015, Kareff, et al.
U.S. Appl. No. 14/988,070, filed Jan. 5, 2016, Kareff, et al.
U.S. Appl. No. 14/844,545, filed Sep. 3, 2015, Kareff, et al.

* cited by examiner

US 10,472,975 B2

DAMPER PIN HAVING ELONGATED BODIES FOR DAMPING ADJACENT TURBINE BLADES

FIELD OF THE INVENTION

The present invention generally relates to a turbine engine having multiple circumferentially aligned turbine blades. More particularly, this invention involves a damper pin for providing vibration damping between adjacent turbine blades of a turbine engine.

BACKGROUND OF THE INVENTION

A turbine blade, also known as a turbine bucket or turbine rotor blade, converts energy from a flowing fluid such as hot combustion gas or steam into mechanical energy by causing a rotor shaft of a turbomachine to rotate. As the turbomachine transitions through various operating modes, the turbine blades are subjected to both mechanical and thermal stresses.

A turbine blade generally includes an airfoil that extends radially outwardly from a platform, a shank that extends radially inwardly from the platform and a dovetail or mounting portion that extends radially inwardly from the shank. The dovetail of each turbine blade is secured within a complementary slot defined in a rotor wheel or disk. The rotor wheel is coupled to the rotor shaft.

During engine operation, vibrations may be introduced into the turbine blades. For example, fluctuations in flow of the hot combustion gases or steam may cause them to vibrate. One basic design consideration for turbomachine designers is to avoid or to minimize resonance with natural frequencies of the turbine blades and the dynamic stresses produced by forced response and/or aero-elastic instabilities, thus controlling high cycle fatigue of the turbine blades. In order to improve the high cycle fatigue life of a turbine blade, vibration dampers are typically provided below and/or between the platforms to frictionally dissipate vibratory energy and reduce the corresponding amplitude of vibration during operation. The amount of vibrational energy that is removed by the vibration damper is a function of the dynamic weight of the vibration damper and the reaction loads.

Although known dampers may be largely adequate during typical operations, there is a desire to improve overall damper effectiveness. Prior attempts to accomplish damping of vibrations have included round damper pins, sheet metal flat dampers, or complex wedge shaped dampers. Often true damper performance of these types of dampers is not known until the first engine test. However, at that time, the damper pocket geometry in the turbine blades is locked in by hard tooling. Thus, if the damper does not perform as expected, then a potentially expensive tooling rework may be required. Accordingly, there is desire for a damping pin that provides a natural frequency tuning tool for resonant mode excitation avoidance and that enables independent mode tuning options without necessitating changes to the design of an existing turbine blade.

BRIEF DESCRIPTION OF THE INVENTION

Aspects and advantages of the invention are set forth below in the following description, or may be obvious from the description, or may be learned through practice of the invention.

One embodiment of the present invention is a damper pin for damping adjacent turbine blades coupled to a rotor disk. The damper pin a first elongated body having a center portion that is disposed between a first end portion and a second end portion. The first end portion, center portion and second end portion define a generally arcuate top portion of the first elongated body. The first elongated body defines a slot that extends axially therethrough. The damper pin further includes a second elongated body having a generally arcuate top portion. The second elongated body is at least partially disposed within the slot. The second elongated body is slideably engaged in an axial direction with the first elongated body.

Another embodiment of the present invention is a turbine engine. The turbine engine includes a rotor shaft that extends axially within the turbine engine and a plurality of turbine blades coupled to the rotor shaft. The turbine blades extend radially outwardly from the rotor shaft. Each turbine blade has an airfoil that extends radially outwardly from a platform. The plurality of turbine blades includes a first turbine blade and a second turbine blade that is adjacent to the first turbine blade. The first and second turbine blades define a groove therebetween. The turbine engine further includes a damper pin disposed within the groove. The damper pin includes a first elongated body having a center portion that is disposed between a first end portion and a second end portion. The first end portion, center portion and second end portion define a generally arcuate top portion of the first elongated body. The first elongated body defines a slot that extends axially therethrough. The damper pin also includes a second elongated body having a generally arcuate top portion. The second elongated body is at least partially disposed within the slot and is slideably engaged in an axial direction with the first elongated body.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
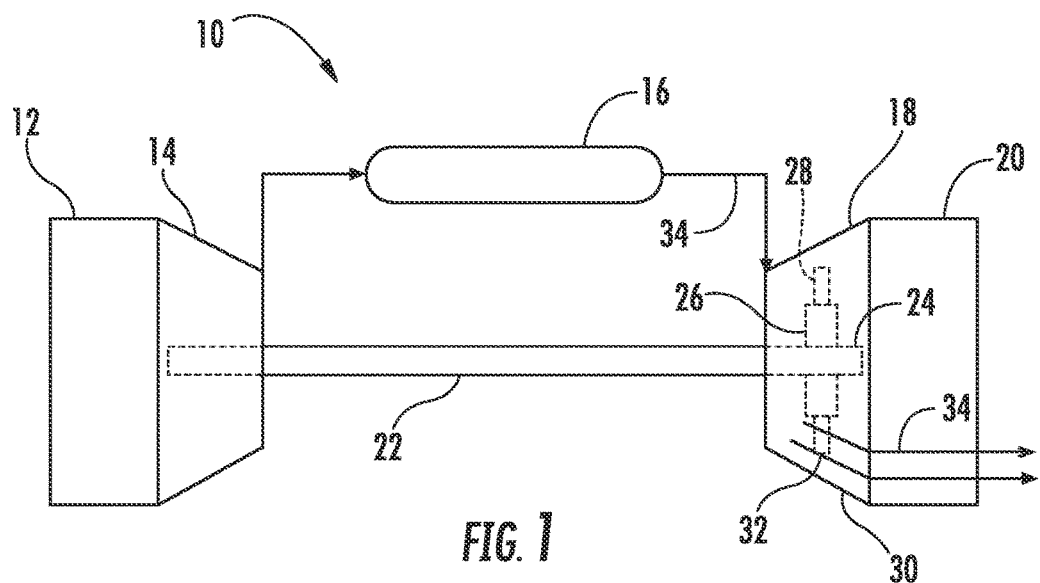
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbomachine including but not limited to a steam turbine, an aircraft gas turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
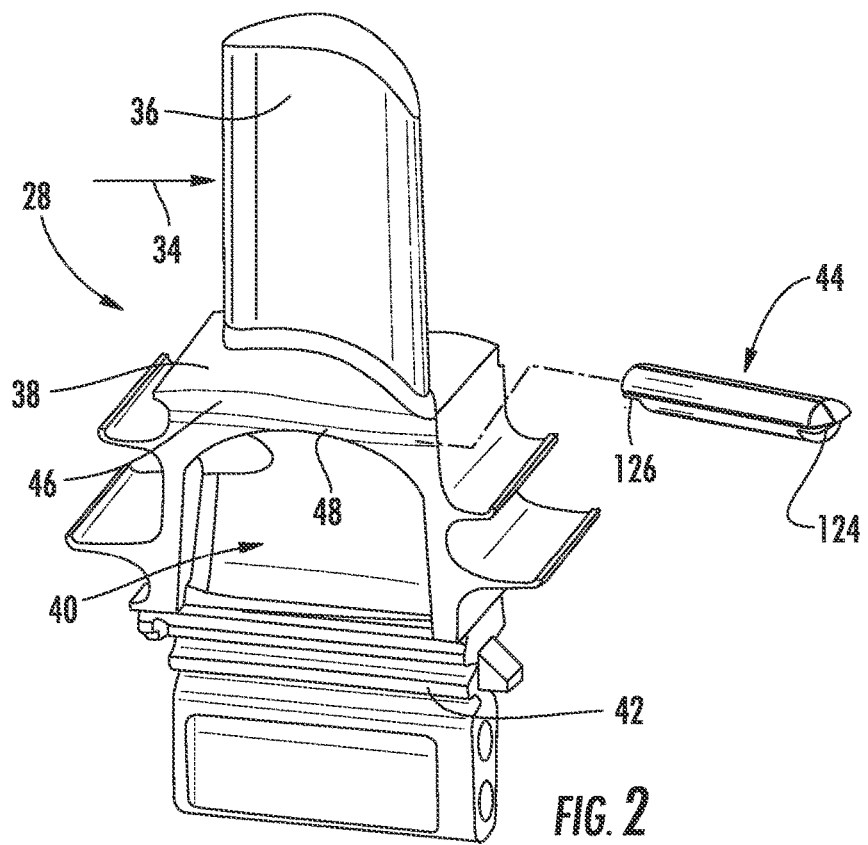
FIG. 2 is a perspective view of an exemplary turbine blade according to at least one embodiment of the present invention.
Figure 3:
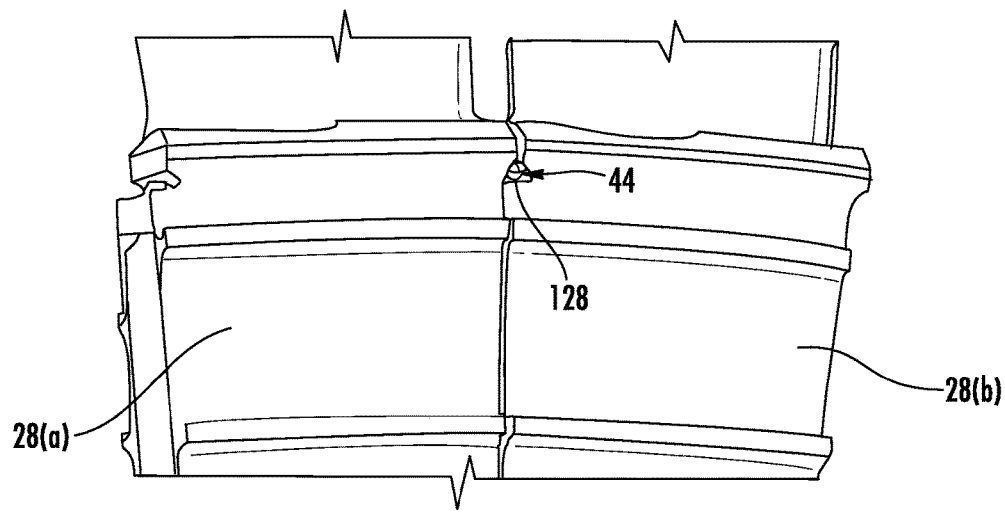
FIG. 3 is a schematic illustration of a damper pin disposed between circumferentially adjacent turbine blades according to at least one embodiment of the present invention.

FIG. 2 illustrates a conventional turbine blade or bucket 28 including an airfoil 36, a platform 38, a shank 40 and a dovetail or mounting portion 42. FIG. 3 provides a downstream view of a pair of circumferentially adjacent turbine blades 28(a), 28(b). As shown in FIG. 2, the dovetail 42 is utilized to secure the turbine blade 28 to a periphery of the rotor disk 26 (FIG. 1), as is well understood in the art. The platform 38 defines an inward flow boundary for the combustion gases 34 flowing through the hot gas path 32 of the turbine section 18 (FIG. 1). In various embodiments of the present invention, a damper pin 44 is located along one axial edge (or slash face) 46 adjacent to (i.e., radially inward of) the turbine blade platform 38. It will be appreciated that a similar damper pin 44 is located between each adjacent pair of turbine blades 28(a), 28(b) (FIG. 3) on the rotor disk 26 (FIG. 1) as apparent from FIG. 3. In particular embodiments, as shown in FIG. 2, the damper pin 44 is located in an elongated groove 48 (FIG. 1) that extends along the entire slash face 46 of the turbine blade 28.

The damper pin 44 serves as a vibration damper. When installed, as shown in FIG. 3, the damper pin 44 is positioned between the adjacent turbine blades 28(a), 28(b). In operation, the damper pin 44 frictionally dissipates vibratory energy and reduces corresponding amplitude of vibration. The amount of vibrational energy that is removed by the damper pin 44 is a function several factors including but not limited to the dynamic weight of the damper pin 44, the geometry of the damper pin 44 and the reaction loads between the adjacent turbine blades 28(a), 28(b).

Figures 4, 5:
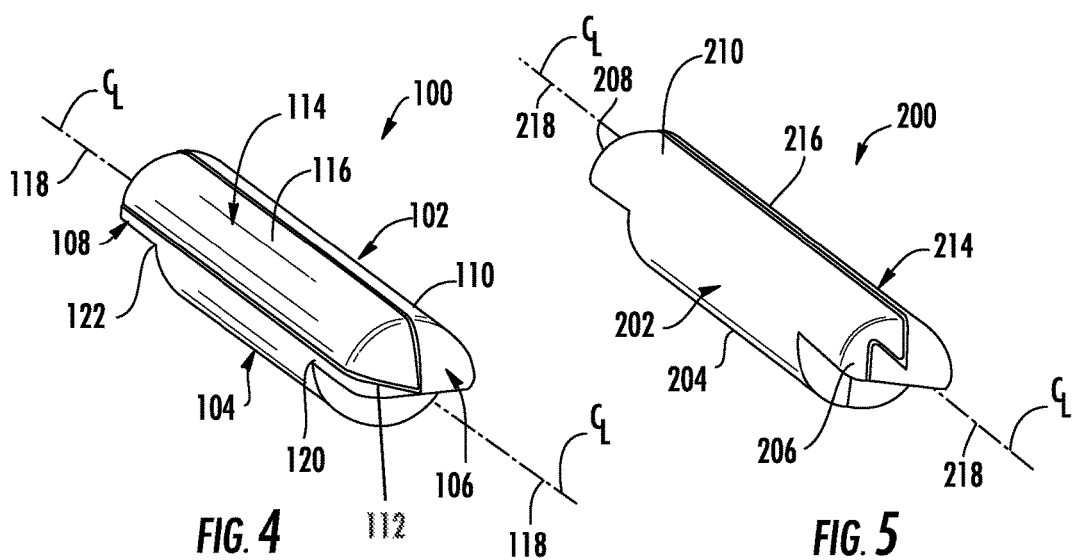
FIG. 4 is a perspective view of an exemplary damper pin according to one embodiment of the present invention.
FIG. 5 is a perspective view of an exemplary damper pin according to one embodiment of the present invention.

FIG. 4 provides a perspective view of an exemplary damper pin 100 according to one embodiment of the present invention. It is to be understood that damper pin 100 shown in FIG. 4 may be substituted for damper pin 44 as shown in FIGS. 2 and 3.

In one embodiment, as shown in FIG. 4 the damper pin 100 includes a first elongated body 102 having a center portion 104 disposed between a first end portion 106 and a second end portion 108. The first end portion 106, center portion 104 and the second end portion 108 define a generally arcuate top portion or surface 110 of the first elongated body 102. The first elongated body 102 further defines a slot 112 that extends axially through the first elongated body 102. For example, in one embodiment, the slot 112 extends continuously through the first end portion 106, the center portion 104 and the second end portion 108.

Damper pin 100 further includes a second elongated body 114 having a generally arcuate top portion or surface 116. In particular embodiments, the slot 112 and the second elongated body 114 are substantially wedge shaped. The second elongated body 114 is at least partially disposed within the slot 112. The second elongated body 114 is slideably engaged with the first elongated body 102 in an axial direction with respect to centerline 118.

In particular embodiments, at least one of the slot 112 of the first elongated body 102 or a contact surface of the second elongated body 114 that is in contact with the slot 112 of the first elongated body 102 is coated with a low-friction wear-resistant coating. The top portion 110 of the first elongated body 102 and the top portion 116 of the second elongated body 114 may configured (sized and/or shaped) to contact with a portion of the groove 48 (FIG. 2) formed between adjacent turbine blades 28(a), 28(b) as shown in FIG. 3.

In particular embodiments, the first end portion 106 and/or the second end portion 108 of the first elongated body 102 are semi-cylindrical. The center portion 104 of the first elongated body 102 may be substantially cylindrical. The first end portion 106 and the second end portion 108 may interface with the center portion 104 at shoulders 120, 122 respectfully. This configuration creates flat support surfaces 124, 126 (best seen in FIG. 2) that are adapted to rest on machined turbine blade platform surfaces or shoulders at opposite ends of the groove 48 formed in the turbine blade slash face 46, thereby providing support for the damper pin 100 while preventing undesirable excessive rotation during machine operation.

Figure 6:
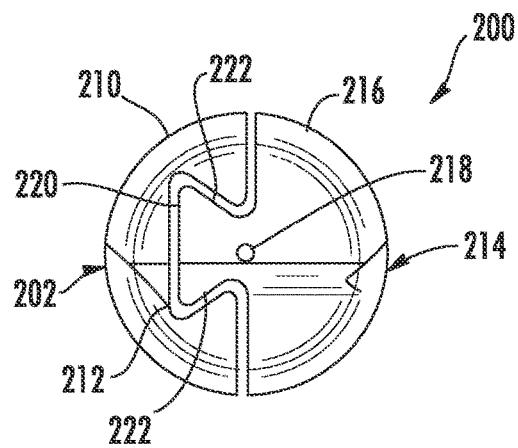
FIG. 6 is a front view of the exemplary damper pin as shown in FIG. 5, according to one embodiment of the present invention.

FIG. 5 provides a perspective view of an exemplary damper pin 200 according to another embodiment of the present invention. FIG. 6 provides a front view of damper pin 200 as shown in FIG. 5. It is to be understood that damper pin 200 as shown collectively in FIGS. 5 and 6 may be substituted for damper pin 44 as shown in FIGS. 2 and 3.

As shown in FIG. 5, damper pin 200 includes a first elongated body 202 having a center portion 204 disposed between a first end portion 206 and a second end portion 208. The first end portion 206, center portion 204 and the second end portion 208 define a generally arcuate top portion or surface 210 of the first elongated body 202.

Figure 7:
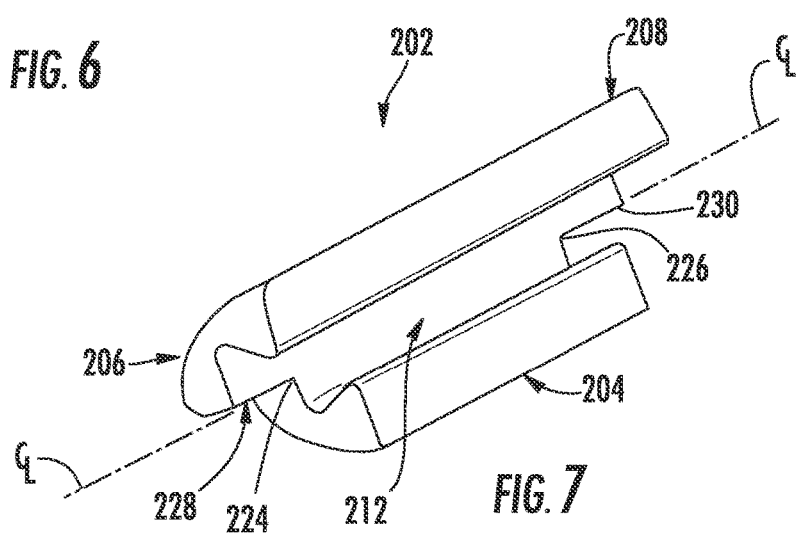
FIG. 7 is a perspective side view of a first elongated body portion of the exemplary damper pin as shown in FIG. 5, according to one embodiment of the present invention.

FIG. 7 provides a perspective side view of the first elongated body 202 as shown in FIGS. 5 and 6, according to one embodiment. As most clearly shown in FIGS. 6 and 7, the first elongated body 202 defines a slot 212 that extends axially through the first elongated body 202. For example, in one embodiment, as shown in FIG. 7, the slot 212 extends continuously through the first end portion 206, the center portion 204 and the second end portion 208. In particular embodiments, as shown in FIGS. 6 and 7, the slot 212 is dovetail shaped. In this manner, the slot 212 may form a dovetail socket or socket of a sliding dovetail joint.

As shown in FIGS. 5 and 6, damper pin 200 further includes a second elongated body 214 having a generally arcuate top portion or surface 216. In particular embodiments, the top portion 210 of the first elongated body 202 and the top portion 216 of the second elongated body 214 may configured (sized and/or shaped) to contact with a portion of the groove 48 (FIG. 2) formed between adjacent turbine blades 28(a), 28(b) as shown in FIG. 3.

Figure 8:
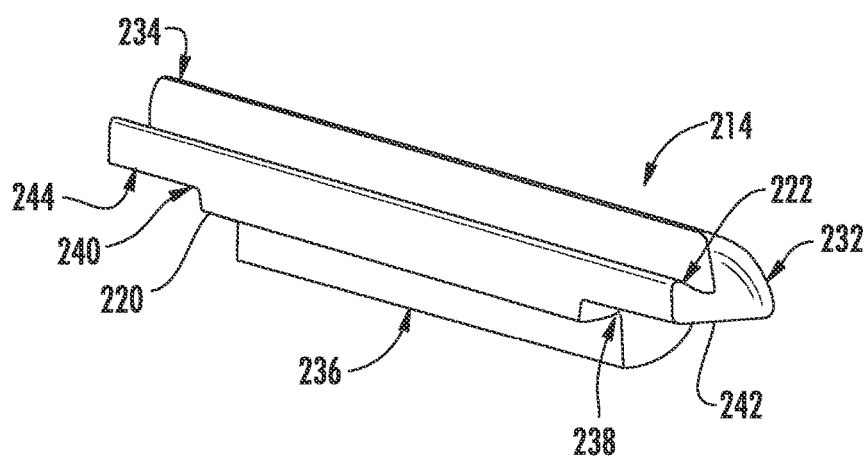
FIG. 8 is a perspective side view of a second elongated body portion of the exemplary damper pin as shown in FIG. 5, according to one embodiment of the present invention.

The second elongated body 214 is at least partially disposed within the slot 212 and is slideably engaged with the first elongated body 202 in an axial direction with respect to centerline 218. FIG. 8 provides a perspective side view of the second elongated body 214 as shown in FIGS. 5 and 6. In particular embodiments, as shown most clearly in FIGS. 6 and 8, the second elongated body 214 includes a dovetail shaped protrusion 220. As shown in FIG. 6, the dovetail shaped protrusion 220 is substantially complementary with the slot 212. In particular embodiments, as show in FIGS. 6-8 collectively, at least one of the slot 212 of the first elongated body 202 or a contact surface 222 of the second elongated body 214 that is in contact with the slot 212 of the first elongated body 202 is coated with a low-friction wear-resistant coating.

In particular embodiments, as shown in FIG. 7, the first end portion 206 and/or the second end portion 208 of the first elongated body 202 are semi-cylindrical. The center portion 204 of the first elongated body 202 may be substantially cylindrical. The first end portion 206 and the second end portion 208 may interface with the center portion 204 at shoulders 224, 226 respectfully. This configuration creates flat support surfaces 228, 230 that are adapted to rest on the machined turbine blade platform surfaces or shoulders at opposite ends of the groove 48 (FIG. 2) formed in the turbine blade slash face 46, thereby providing support for the damper pin 200 while preventing undesirable excessive rotation during machine operation.

In particular embodiments, as shown in FIG. 8, a first end portion 232 and/or a second end portion 234 of the second elongated body 214 are semi-cylindrical. A center portion 236 of the second elongated body 214 may be substantially cylindrical. The first end portion 232 and the second end portion 234 may interface with the center portion 236 at shoulders 238, 240 respectfully. This configuration further creates flat support surfaces 242, 244 that are adapted to rest on the machined turbine blade platform surfaces or shoulders at opposite ends of the groove 48 (FIG. 2) formed in the turbine blade slash face 46, thereby providing support for the damper pin 200 while preventing undesirable excessive rotation during machine operation. The flat surfaces may be defined generally adjacent to the flat surfaces 228, 230 of the first elongated body 202.

The various embodiments of the damper pin illustrated and described herein, provide various technical benefits over existing damper pin known in the art. For example, the multi piece damper pins 100, 200 provided herein allow for tuning the natural frequency of an existing turbine blade system with an additional advantage of not requiring modifications to the turbine blade or more particularly, to the exiting grooves. In addition, the sliding engagement between the first elongated body 102, 202 and the second elongated body 114, 214 allows for relative movement between the two bodies, thus impacting stiffness in a single direction independent of stiffness in others directions, thus allowing for natural frequency tuning of specific modes that are more sensitive to particular stiffness directions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A damper pin for damping adjacent turbine blades coupled to a rotor disk, the damper pin comprising:
   a first elongated body having a center portion disposed between a first end portion and a second end portion, wherein the first end portion, center portion and second end portion define a generally arcuate top portion of the first elongated body, wherein the first elongated body defines a slot that extends axially therethrough;
a second elongated body having a generally arcuate top portion, wherein the second elongated body is at least partially disposed within the slot, and wherein the second elongated body is slideably engaged in an axial direction with the first elongated body, wherein the first end portion of the first elongated body and the generally arcuate top portion of the second elongated body collectively define a first semi-cylindrical shape, and wherein the second end portion of the first elongated body and the generally arcuate top portion of the second elongated body collectively define a second semi-cylindrical shape.

2. The damper pin as in claim 1, wherein the top portion of the first elongated body and the top portion of the second elongated body are configured to contact with a portion of a groove formed between adjacent turbine blades.

3. The damper pin as in claim 1, wherein the slot extends axially through the first end portion, the center portion and the second end portion of the first elongated body.

4. A damper pin for damping adjacent turbine blades coupled to a rotor disk, the damper pin comprising:
a first elongated body having a center portion disposed between a first end portion and a second end portion, wherein the first end portion, center portion and second end portion define a generally arcuate top portion of the first elongated body, wherein the first elongated body defines a slot that extends axially therethrough;
a second elongated body having a generally arcuate top portion, wherein the second elongated body is at least partially disposed within the slot, and wherein the second elongated body is slideably engaged in an axial direction with the first elongated body, wherein the slot and the second elongated body are substantially wedge shaped.

5. A damper pin for damping adjacent turbine blades coupled to a rotor disk, the damper pin comprising:
a first elongated body having a center portion disposed between a first end portion and a second end portion, wherein the first end portion, center portion and second end portion define a generally arcuate top portion of the first elongated body, wherein the first elongated body defines a slot that extends axially therethrough;
a second elongated body having a generally arcuate top portion, wherein the second elongated body is at least partially disposed within the slot, and wherein the second elongated body is slideably engaged in an axial direction with the first elongated body, wherein the slot is dovetail shaped.

6. The damper pin as in claim 5, wherein the second elongated body includes a dovetail shaped protrusion that is complementary with the slot.

7. A turbine engine, comprising:
a rotor shaft that extends axially within the turbine engine;
a plurality of turbine blades coupled to the rotor shaft and extending radially outwardly therefrom, each turbine blade having an airfoil that extends radially outwardly from a platform, the plurality of turbine blades including a first turbine blade and a second turbine blade adjacent to the first turbine blade, wherein the first and second turbine blades define a groove therebetween; and
a damper pin disposed within the groove, the damper pin comprising:
a first elongated body having a center portion disposed between a first end portion and a second end portion, wherein the first end portion, center portion and second end portion define a generally arcuate top portion of the first elongated body, wherein the first elongated body defines a slot that extends axially therethrough;
a second elongated body having a generally arcuate top portion, wherein the second elongated body is at least partially disposed within the slot, and wherein the second elongated body is slideably engaged in an axial direction with the first elongated body, wherein the first end portion of the first elongated body and the generally arcuate top portion of the second elongated body collectively define a first semi-cylindrical shape, and wherein the second end portion of the first elongated body and the generally arcuate top portion of the second elongated body collectively define a second semi-cylindrical shape.

8. The turbine engine as in claim 7, wherein the top portion of the first elongated body and the top portion of the second elongated body are configured to contact with a portion of the groove formed between adjacent turbine blades.

9. The turbine engine as in claim 7, wherein the slot extends axially through the first end portion, the center portion and the second end portion of the first elongated body.

10. The turbine engine as in claim 7, wherein the second elongated body includes a first end portion and a second end portion, wherein the first end portion and the second end portion of the second elongated body are semi-cylindrical.

11. A turbine engine, comprising:
a rotor shaft that extends axially within the turbine engine;
a plurality of turbine blades coupled to the rotor shaft and extending radially outwardly therefrom, each turbine blade having an airfoil that extends radially outwardly from a platform, the plurality of turbine blades including a first turbine blade and a second turbine blade adjacent to the first turbine blade, wherein the first and second turbine blades define a groove therebetween; and
a damper pin disposed within the groove, the damper pin comprising:
a first elongated body having a center portion disposed between a first end portion and a second end portion, wherein the first end portion, center portion and second end portion define a generally arcuate top portion of the first elongated body, wherein the first elongated body defines a slot that extends axially therethrough;
a second elongated body having a generally arcuate top portion, wherein the second elongated body is at least partially disposed within the slot, and wherein the second elongated body is slideably engaged in an axial direction with the first elongated body, wherein the slot and the second elongated body are substantially wedge shaped.

12. A turbine engine, comprising:
a rotor shaft that extends axially within the turbine engine;
a plurality of turbine blades coupled to the rotor shaft and extending radially outwardly therefrom, each turbine blade having an airfoil that extends radially outwardly from a platform, the plurality of turbine blades including a first turbine blade and a second turbine blade adjacent to the first turbine blade, wherein the first and second turbine blades define a groove therebetween; and a damper pin disposed within the groove, the damper pin comprising:
   a first elongated body having a center portion disposed between a first end portion and a second end portion, wherein the first end portion, center portion and second end portion define a generally arcuate top portion of the first elongated body, wherein the first elongated body defines a slot that extends axially therethrough;
   a second elongated body having a generally arcuate top portion, wherein the second elongated body is at least partially disposed within the slot, and wherein the second elongated body is slideably engaged in an axial direction with the first elongated body, wherein the slot is dovetail shaped.

13. The turbine engine as in claim 12, wherein the second elongated body includes a dovetail shaped protrusion that is complementary with the slot.

\* \* \* \* \*